United States Patent
Gardynik et al.

(10) Patent No.: US 10,800,228 B2
(45) Date of Patent: Oct. 13, 2020

(54) LEAF SCREEN AND METHOD OF MAKING THE LEAF SCREEN WITH CO-MOLDED SEAL AND BUMP STOP

(71) Applicant: Ford Global Technologies, LLC, Dearborn, MI (US)

(72) Inventors: Michael J. Gardynik, Farmington Hills, MI (US); Kevin Michael O'Callaghan, Trenton, MI (US); Thomas J. Joseph, Chesterfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 21 days.

(21) Appl. No.: 15/951,402

(22) Filed: Apr. 12, 2018

(65) Prior Publication Data
US 2019/0315199 A1    Oct. 17, 2019

(51) Int. Cl.
*B60H 1/28* (2006.01)
*B60R 13/06* (2006.01)
(Continued)

(52) U.S. Cl.
CPC .............. *B60H 1/28* (2013.01); *B60R 13/06* (2013.01); *E05F 5/022* (2013.01); *B29C 45/0003* (2013.01); *B29C 45/1676* (2013.01); *B29C 2045/1678* (2013.01); *B60Y 2410/122* (2013.01); *B62D 25/081* (2013.01); *B62D 25/105* (2013.01); *E05Y 2201/224* (2013.01); *E05Y 2800/12* (2013.01); *E05Y 2800/205* (2013.01); *E05Y 2800/23* (2013.01);
(Continued)

(58) Field of Classification Search
USPC ........................................ 454/150; 296/192
See application file for complete search history.

(56) References Cited

U.S. PATENT DOCUMENTS

| 4,819,550 A * | 4/1989 | Ioka ......................... B60H 1/28 454/147 |
| 5,251,954 A * | 10/1993 | Vande Kopple .... B29C 45/1635 296/192 |

(Continued)

FOREIGN PATENT DOCUMENTS

EP    1800999 A1    6/2007

OTHER PUBLICATIONS

Society of Plastics Engineers, Automotive Design, Innovation Awards, Nov. 9, 2018, 56 pages, US.

*Primary Examiner* — Edelmira Bosques
*Assistant Examiner* — Frances F. Hamilton
(74) *Attorney, Agent, or Firm* — David Coppiellie; Brooks Kushman P.C.

(57) ABSTRACT

A leaf screen for an air intake of an HVAC system of a vehicle having a hood covering an engine compartment. The leaf screen includes a leaf screen body defining an air inlet opening covered by an integrally molded screen. A seal is integrally molded on a top surface of the leaf screen body in front of the air inlet opening. Bump-stops are integrally molded on the top surface that are engaged by an inner panel of the hood when closed. A method of making the leaf screen includes injecting a polymeric material into a mold to form a body portion. At least one elastomeric material is injected into the mold on one side of the body portion to form a seal and a plurality of bump-stops.

6 Claims, 3 Drawing Sheets

(51) Int. Cl.
  *E05F 5/02* (2006.01)
  *B62D 25/10* (2006.01)
  *B62D 25/08* (2006.01)
  *B29C 45/00* (2006.01)
  *B29C 45/16* (2006.01)
(52) U.S. Cl.
  CPC ..... *E05Y 2800/46* (2013.01); *E05Y 2800/678* (2013.01); *E05Y 2900/536* (2013.01)

(56) References Cited

U.S. PATENT DOCUMENTS

| | | | |
|---|---|---|---|
| 5,553,912 A * | 9/1996 | Kubina | B60J 1/2005 296/192 |
| 6,026,852 A * | 2/2000 | Barton | B29C 45/0062 137/512.1 |
| 6,033,300 A * | 3/2000 | Schneider | B60H 1/28 296/192 |
| 6,565,148 B1 * | 5/2003 | Teramoto | B62D 25/081 180/69.2 |
| RE38,157 E * | 6/2003 | Schneider | B60H 1/28 296/192 |
| 6,830,288 B2 | 12/2004 | Eynon et al. | |
| 7,316,447 B2 * | 1/2008 | Kelly | B62D 25/081 296/192 |
| 7,740,307 B2 * | 6/2010 | Benvenuto | B29C 45/1635 296/192 |
| 7,988,223 B2 * | 8/2011 | Nakajima | B62D 25/081 296/192 |
| 8,573,682 B2 | 11/2013 | Oomen | |
| 8,702,155 B2 | 4/2014 | Suzuki | |
| 8,955,896 B2 * | 2/2015 | Baxter | B60R 13/04 296/1.08 |
| 8,985,678 B2 * | 3/2015 | Sugishima | B60R 13/0838 296/192 |
| 9,889,890 B1 * | 2/2018 | Manginen | B60R 13/0838 |
| 9,919,464 B2 * | 3/2018 | Bland | B29C 45/1628 |
| 10,583,708 B2 * | 3/2020 | Pain | B60H 1/00021 |
| 2006/0087155 A1 * | 4/2006 | Koyama | B62D 25/081 296/192 |
| 2006/0202516 A1 * | 9/2006 | Mori | B60S 1/52 296/192 |
| 2010/0120346 A1 * | 5/2010 | Jansen | B60H 1/249 454/152 |
| 2012/0091756 A1 * | 4/2012 | Suzuki | B62D 25/081 296/192 |
| 2013/0192801 A1 * | 8/2013 | Leonard | B60K 11/08 165/109.1 |
| 2014/0062117 A1 * | 3/2014 | Baxter | B60R 13/04 296/1.08 |
| 2014/0097579 A1 * | 4/2014 | Bland | B62D 29/04 277/637 |
| 2014/0318308 A1 * | 10/2014 | Puskar, Jr. | G05G 1/10 74/553 |
| 2015/0004897 A1 * | 1/2015 | Ishikawa | B60H 1/3421 454/155 |
| 2015/0068128 A1 * | 3/2015 | Baxter | B60R 13/06 49/480.1 |
| 2015/0336620 A1 * | 11/2015 | Kurihara | B60R 13/07 296/192 |
| 2019/0270362 A1 * | 9/2019 | Barnes | F16K 17/02 |

\* cited by examiner

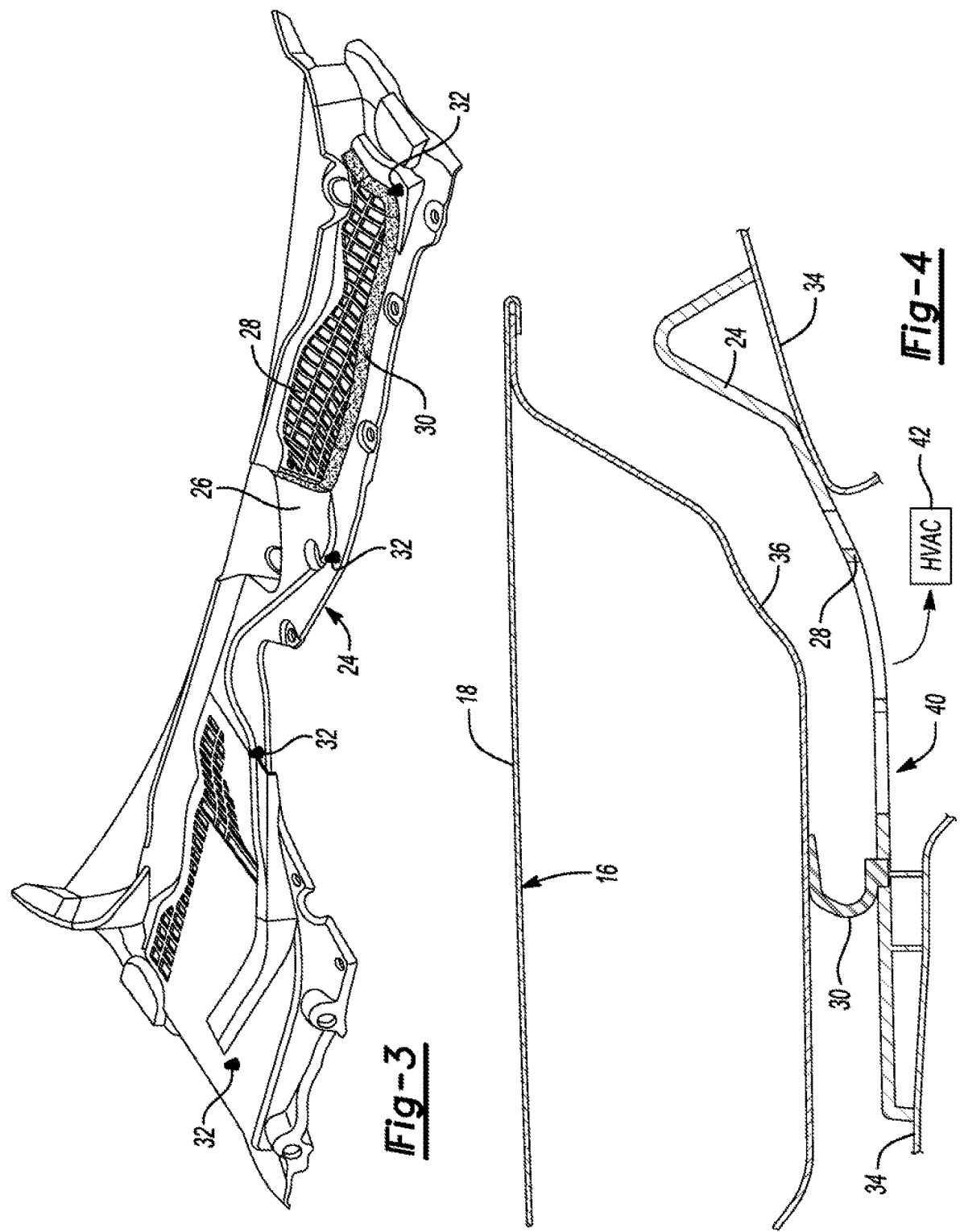

LEAF SCREEN AND METHOD OF MAKING THE LEAF SCREEN WITH CO-MOLDED SEAL AND BUMP STOP

TECHNICAL FIELD

This disclosure relates to a leaf screen for a vehicle that is formed with an air intake seal and hood bump-stops in a co-molding operation.

BACKGROUND

Leaf screens are provided between the back edge of a vehicle hood and the lower edge of a windshield frame. Leaf screens include fresh air intake ducts that draw air into heating, ventilation, and air conditioning (HVAC) systems. It is known to assemble a seal to a hood that extends across the full lateral extent of the rear edge of the hood to inhibit air, heated by the engine, from passing from the engine compartment into the fresh air intake and adversely effecting air conditioning performance.

Bump-stops are assembled to parts of the vehicle body forming the rear portion of the engine compartment to prevent hood flutter. Bump-stops are compressed by the rear edge of the hood when the hood is closed and apply pressure against a lower surface of the hood.

Assembling a seal on the rear edge of the hood and bump-stops to the rear portion of the engine compartment increases labor costs because it adds to the number of assembly operations and adds to the number of parts and complexity of assembly operations.

Seals and bump-stops add weight to a vehicle and adversely impact efforts to reduce vehicle weight and improve fuel economy. Seals and bump-stops require mounting portions in addition to the bumpers and seals that are used to attach them to the vehicle.

This disclosure is directed to solving the above problems and other problems as summarized below.

SUMMARY

According to one aspect of this disclosure, a leaf screen is disclosed for an air intake of an HVAC system of a vehicle having a hood covering an engine compartment. The leaf screen includes a leaf screen body defining an air inlet opening. A seal is integrally molded on a top surface of the leaf screen body in front of the air inlet opening and at least partially surrounds the air inlet. Alternatively, the seal may extend the full width of the leaf screen but this would add weight compared to partially surrounding the air inlet. Several bump-stops are integrally molded on the top surface that are engaged by an inner panel of the hood when closed.

According to alternative aspects of this disclosure as it relates to a leaf screen, the seal may extend upwardly from the leaf screen body. The seal may be formed of an elastomeric material softer than a polymeric material forming the leaf screen body. The bump-stops may extend upwardly from the leaf screen body. The bump-stops may be formed of an elastomeric material softer than polymeric material forming the leaf screen body. The seal may be formed of an elastomeric material softer than the than the material forming bump-stops and the bump-stops may be formed of an elastomeric material softer than a polymeric material forming the leaf screen body.

According to another aspect of this disclosure, a vehicle is disclosed that comprises a body defining an engine compartment, a hood assembled to the body, and a leaf screen defining an air inlet behind the engine compartment. The leaf screen is integrally formed with a seal provided on a top surface of the leaf screen in front of the air inlet. The seal is engaged by an inner panel of the hood. A plurality of bump-stops are also provided on the top surface of the leaf screen that are engaged by the inner panel when the hood is closed.

According to alternative aspects of this disclosure as it relates to a vehicle, the seal may be integral with the leaf screen and may extend upwardly from a body portion. The seal may be formed of an elastomeric material softer than a polymeric material forming the leaf screen. The bump-stops may be integral with the leaf screen and the bump-stops may extend upwardly from the body portion. The bump-stops may be formed of an elastomeric material softer than polymeric material forming the leaf screen. The seal and the bump-stops may both be integrally formed with the leaf screen. The seal is formed of an elastomeric material softer than the than the material forming bump-stops, and the bump-stops are formed of an elastomeric material softer than a polymeric material forming the leaf screen.

According to another aspect of this disclosure, a method is disclosed for making a leaf screen. The method includes an initial step of injecting a polymeric material into a mold to form a body portion. At least one elastomeric material is injected into the mold on a first side of the body portion to form a seal and a plurality of bump-stops. The polymeric material and the elastomeric material are cooled in the mold to solidify and join the polymeric material and the elastomeric material. The leaf screen is then removed from the mold.

According to alternative aspects of the method, the elastomeric material may include a first elastomeric material for forming the seal and a second elastomeric material for forming the bump-stops. The same type of elastomeric material may be used for forming the seal and the bump-stops. During the cooling step the polymeric material and the elastomeric material bond to each other. The seal is formed along a screen portion of the leaf screen that is disposed above an HVAC air inlet opening. The seal is engaged by the hood of the vehicle when the hood is closed. The bump-stops may be formed at spaced apart locations across the lateral width of the leaf screen.

The above aspects of this disclosure and other aspects will be described below with reference to the attached drawings.

BRIEF DESCRIPTION OF THE DRAWINGS

FIG. 3 is a perspective view of a leaf screen made according to this disclosure.

FIG. 4 is a cross-section view taken along the line 4-4 in FIG. 2.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
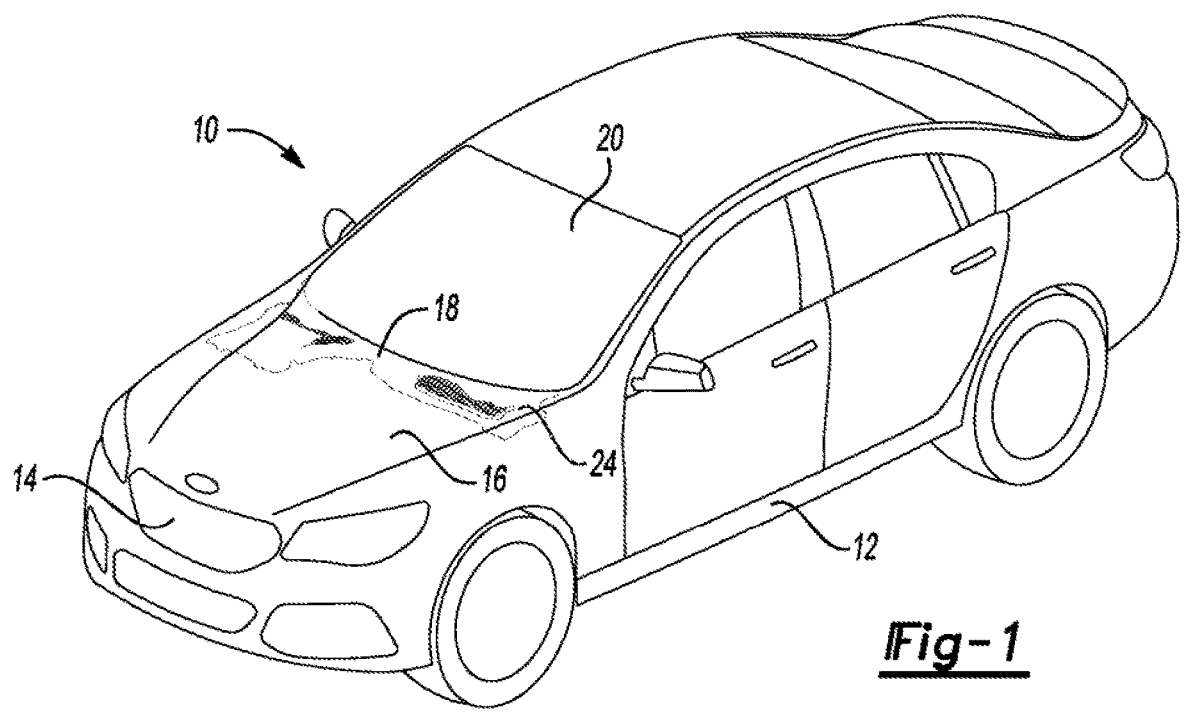
FIG. 1 is a front left side perspective view of a vehicle showing a leaf screen in phantom lines.

Referring to FIG. 1, a vehicle generally indicated by reference numeral 10 is illustrated that includes a body 12 defining an engine compartment 14. A hood 16 covers the engine compartment 14 and has a rear portion 18 that is connected by hinges (not shown) to the body 12 below and in front of the windshield 20.

Figure 2:
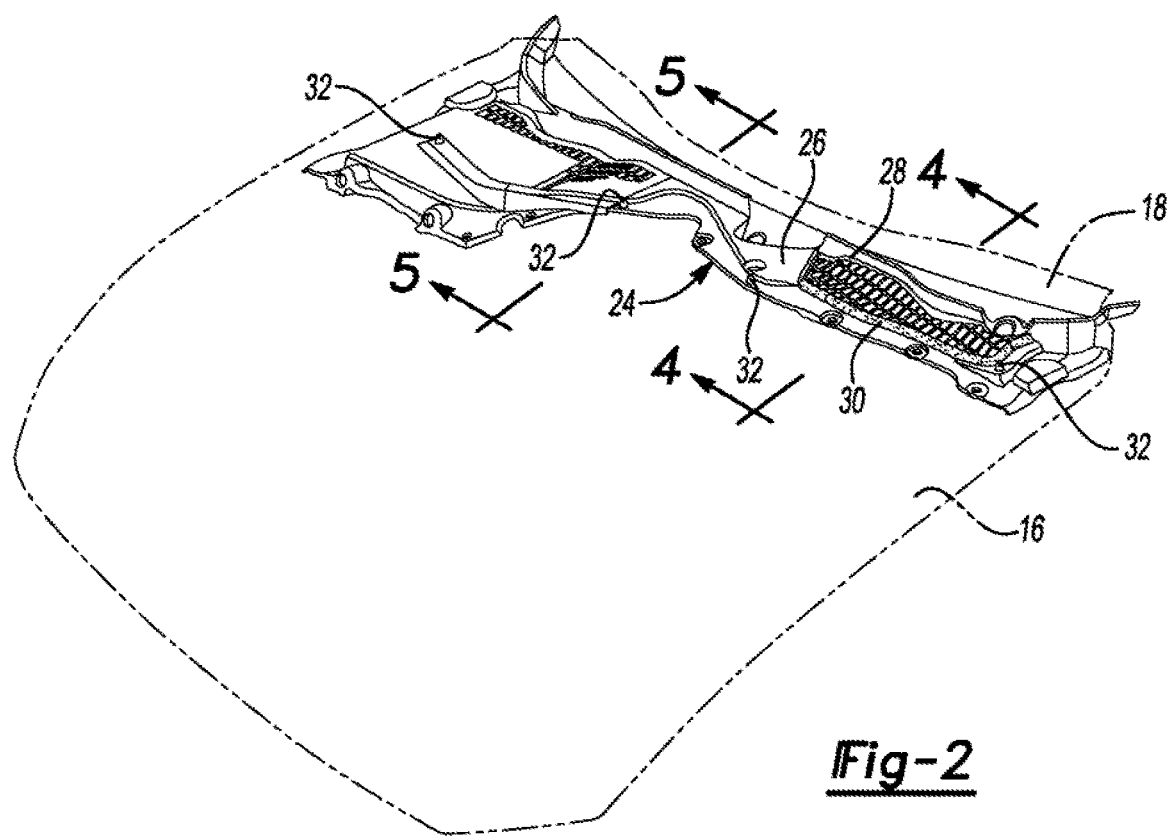
FIG. 2 is a perspective view of a leaf screen made according to this disclosure showing the location of the leaf screen relative to a hood that is shown in phantom lines.

Referring to FIGS. 1-3, a leaf screen 24 is illustrated that includes a body portion 26 and a screen 28. The body portion 26 and the screen 28 are formed of a relatively rigid thermoplastic polymer having a hardness of between Rockwell R 75 and 120. The thermoplastic polymer may be, for example, polypropylene including a talc filler and other additives.

A seal 30 is co-molded onto the leaf screen and is assembled to the vehicle 10 with the leaf screen 24 between the hood 16 covering the engine compartment 14 and the screen 28 to inhibit the flow of air heated by the engine through the screen 28. The seal 30 is formed of a thermoplastic elastomer having a hardness of between Shore A 10 and 65. The thermoplastic elastomer may be thermoplastic vulcanizate (TPV), ethylene propylene diene monomer (EPDM), nitrile, or rubber. The seal 30 is co-molded onto the body 26 of the leaf screen 24 in an injection molding process.

A plurality of bump-stops 32 are co-molded onto the body 26 of the leaf screen and are assembled to the vehicle 10 along with the leaf screen 24 between the hood 16 covering the engine compartment 14 and the windshield 20. The bump-stops 32 are provided to dampen any tendency of the hood 16 to flutter, or vibrate, when the vehicle 10 is driven at higher speeds. The bump-stops 32 are formed of a thermoplastic elastomer having a hardness of between Shore A 30 and 100. The thermoplastic elastomer may be TPV, EPDM, nitrile, or rubber. The bump-stops are co-molded onto the body 26 of the leaf screen 24 in an injection molding process.

The leaf screen 24 is relatively harder than the bump-stops 32 and the bump-stops 32 are relatively harder than the seal 30.

Referring to FIG. 4, the leaf screen 24 is shown to be assembled onto a cowl panel 34. The seal 30 is shown engaging an inner panel 36 of the hood 16. The cowl panel 34 defines an air inlet 40 for a heating and air conditioning system (HVAC system) 42 that controls the environment inside the vehicle's 10 passenger compartment (not shown). The seal 30 is located in front of the screen 28 and engages the inner panel 36 of the hood 16 to block air flow from the engine compartment 14 from flowing into the air inlet 40 and into the HVAC system 42. To be effective, the seal must be compressed between the leaf screen 24 and the inner panel 36 of the hood 16.

Figure 5:
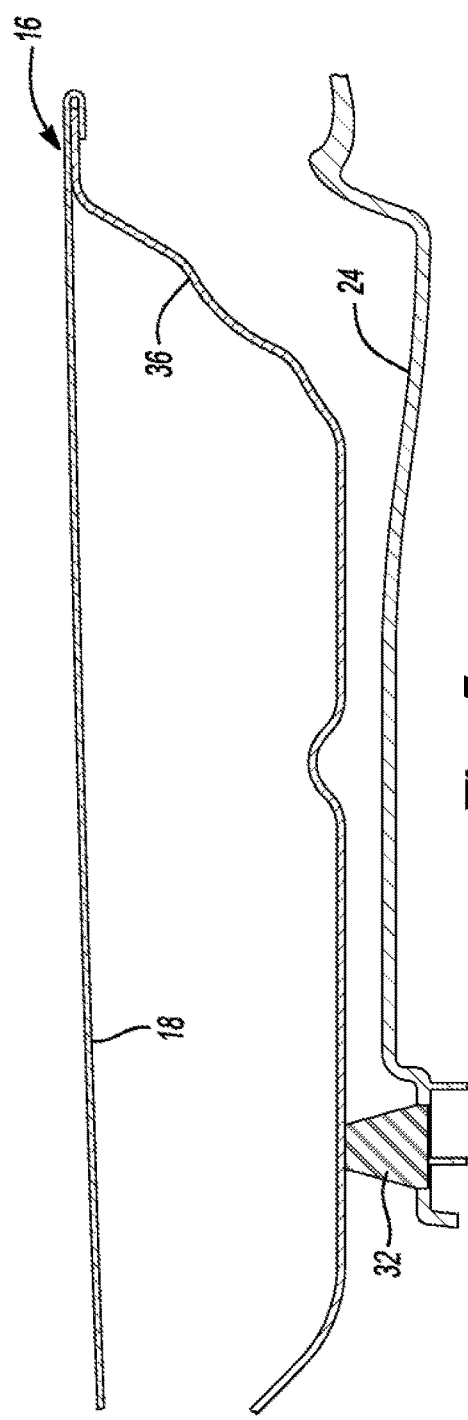
FIG. 5 is a cross-section view taken along the line 5-5 in FIG. 2.

Referring to FIG. 5, the bump-stop 32 is attached in the injection molding co-molding process to the leaf screen 24. Since the purpose of the bump-stop 32 is to dampen fluttering of the hood 16, is generally relatively harder than the seal 30 (shown in FIG. 4) but softer and more elastic than the body 26 of the leaf screen 24. The same thermoplastic elastomeric material could be used for both the seal 30 and the bump-stops 32 or they could be formed of different thermoplastic elastomers. The hardness of the seal 30 and bump-stops 32 may be modified by the design of the part structure. The thermoplastic elastomer material used for the seal 30 and the bump-stops 32 may be different compositions or may have different volumes of fillers or additives.

Figure 6:
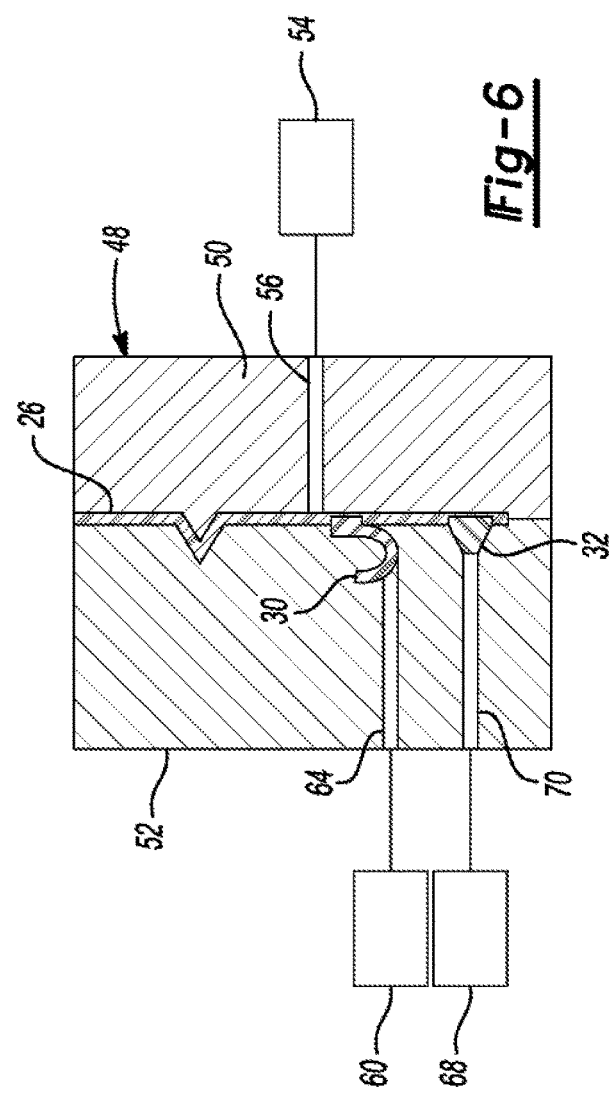
FIG. 6 is a diagrammatic cross-section view of an injection molding die used in the co-molding method of this disclosure.

Referring to FIG. 6, an injection molding tool 48 for practicing the co-molding method is illustrated that includes a first mold part 50 and a second mold part 52. A thermoplastic polymer source 54 provides melted thermoplastic material through a first injection port 56 to form the body 26. A first elastomer source 60 provides melted thermoplastic elastomer through a second injection port 64 to form the seal 30. A second elastomer source 68 provides melted thermoplastic elastomer through a third injection port 70 to form the bump-stops.

In the co-molding process, the materials injected into the mold 48 are injected during a single mold injection step. The injections may be substantially simultaneous (within a single molding operation process window) causing the materials to mix while molten thereby bonding the dissimilar materials together. It is also possible that the materials may be sequentially injected depending upon the properties of the materials or injection molding machine limitations and constraints.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A leaf screen for an intake of an HVAC system of a vehicle having a hood covering an engine compartment, comprising:
   a leaf screen body defining an inlet opening;
   a seal integrally molded on a top surface of the leaf screen body partially surrounding the inlet opening and engaged by the hood when closed; and
   a plurality of bump-stops integrally molded on the top surface at laterally spaced locations on the leaf screen body with a bump stop being located adjacent right and left outer ends of the leaf screen body and at least one bump-stop being disposed at an intermediate location between the right and left outer ends, the bump-stops being spaced from the seal, wherein the bump stops and the seal are engaged by the hood when closed.

2. The leaf screen of claim 1 wherein the seal extends upwardly from the leaf screen body.

3. The leaf screen of claim 2 wherein the seal is formed of an elastomeric material softer than a polymeric material forming the leaf screen body.

4. The leaf screen of claim 1 wherein the bump-stops extend upwardly from the leaf screen body.

5. The leaf screen of claim 4 wherein the bump-stops are formed of an elastomeric material softer than a polymeric material forming the leaf screen body.

6. The leaf screen of claim 1 wherein the seal is formed of a first elastomeric material softer than a second elastomeric material forming bump-stops, and wherein the second elastomeric material s softer than a polymeric material forming the leaf screen body.

* * * * *